April 1, 1924.  F. A. STEVENS  1,489,169
OPHTHALMIC MOUNTING
Filed Dec. 23, 1919  2 Sheets-Sheet 1

Inventor:
F. A. Stevens
David Rines
Attorney:-

April 1, 1924.     F. A. STEVENS     1,489,169
OPHTHALMIC MOUNTING
Filed Dec. 23, 1919     2 Sheets-Sheet 2

Inventor
F. A. Stevens.
David Rines
Attorney:-

Patented Apr. 1, 1924.

1,489,169

UNITED STATES PATENT OFFICE.

FREDERICK A. STEVENS, OF PROVIDENCE, RHODE ISLAND, ASSIGNOR, BY MESNE ASSIGNMENTS, TO BAUSCH AND LOMB OPTICAL COMPANY, OF ROCHESTER, NEW YORK, A CORPORATION OF NEW YORK.

OPHTHALMIC MOUNTING.

Application filed December 23, 1919. Serial No. 346,953.

*To all whom it may concern:*

Be it known that I, FREDERICK ARTHUR STEVENS, a citizen of the United States, and a resident of Providence, in the county of Providence and State of Rhode Island, have invented a new and useful Improvement in Ophthalmic Mountings, of which the following is a specification:

The present invention relates to ophthalmic mountings and more particularly to eyeglass mountings of the type in which the lens rims are split at the point of juncture with the bridge. The term "eyeglasses" will be employed in the claims as synonymous with "ophthalmic mounting".

An object of the invention is to simplify and improve the construction of eyeglass and guard mountings.

In present-day eyeglass mountings, as usually constructed, the guards are mounted in close proximity to the ends of the bridge and so interfere with the operation of adjusting the bridge.

A further object of the invention is to provide an improved ophthalmic mounting of the above-described character in which the bridge may be adjusted without interference from the guards.

To this end, a feature of the invention contemplates an eyeglass frame in which the bridge and the guard are mounted in close proximity to each other, one upon each of the end pieces of the lens rims so that, upon separation of the end pieces, the guard will be moved out of the way of the portion of the bridge which it may be desired to adjust. As a further feature, the bridge is constructed to enter a recess in the guard end piece so as to prevent relative movement of the guard and the bridge after the parts are secured in assembled relation.

Another object of the invention is to provide an improved eyeglass mounting in which the relative positions of the rim, the bridge and the guard may be readily altered during the process of manufacture.

With this result in view, a feature of the invention resides in mounting the end piece upon the end of the rim at any desired angle.

With these and other objects in view, as will be made clear as the description proceeds, the invention consists of the improved ophthalmic mounting hereinafter described, illustrated in the accompanying drawings and defined in the appended claims.

Figure 1:
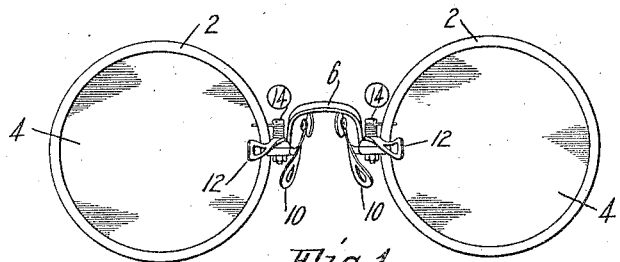
Figure 2:
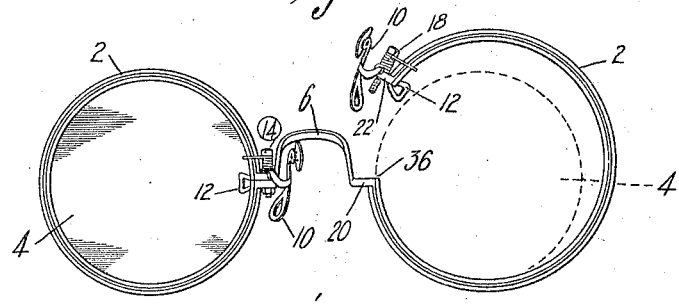
Figures 3, 4, 5:
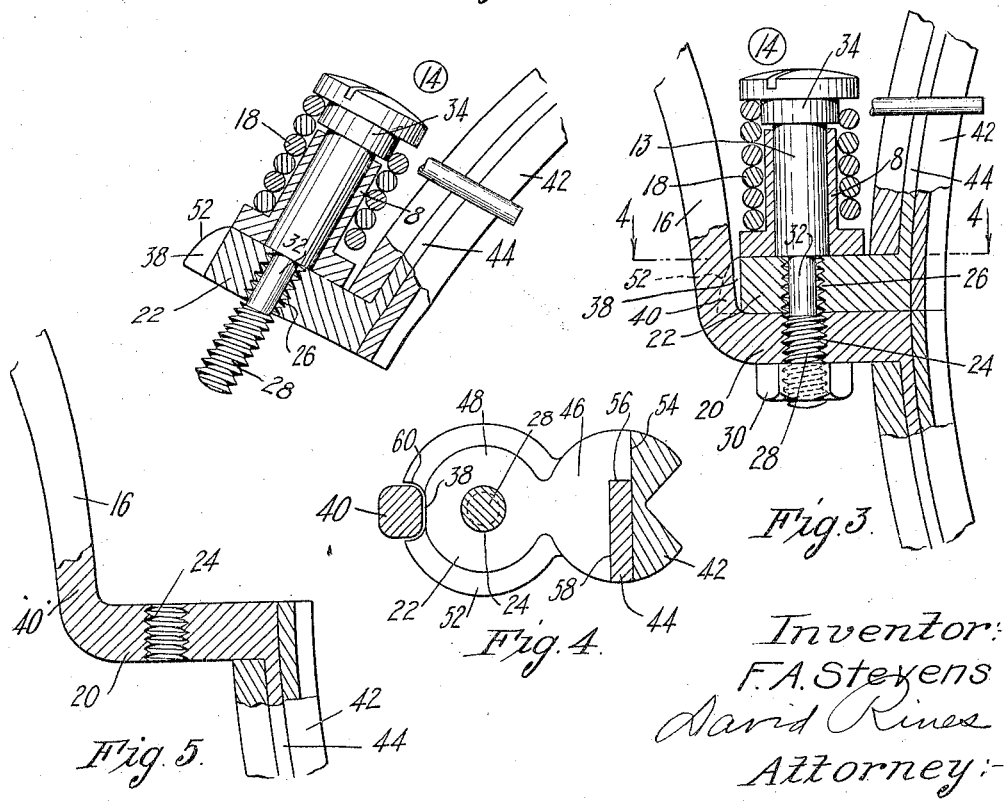
Figure 6:
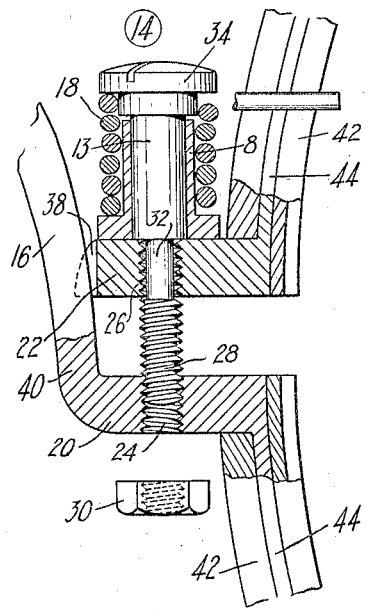
Figure 8:
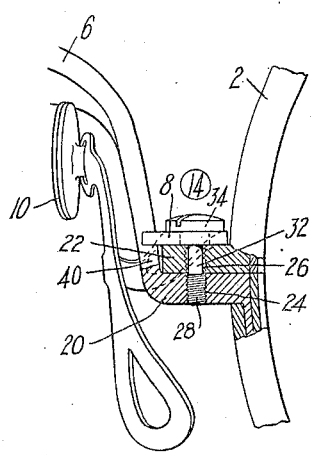
Figure 9:
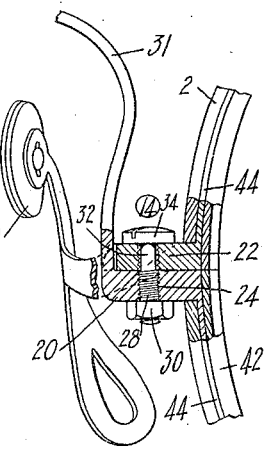
Figure 7:
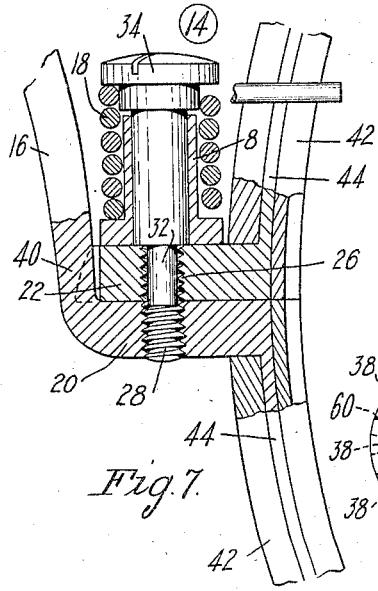
Figure 10:
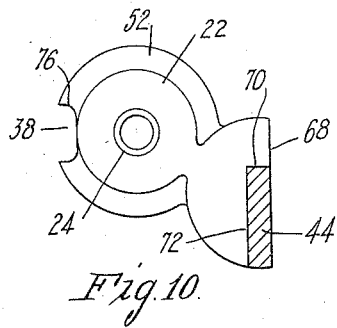
Figure 11:
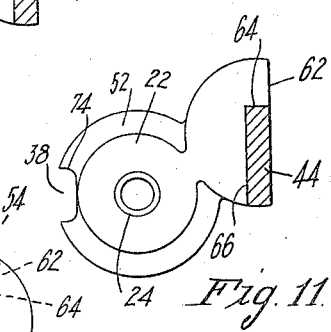
Figure 12:
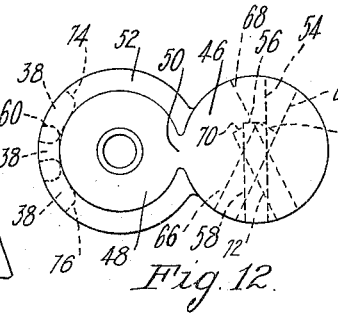

In the drawings, Fig. 1 is a front view of an ophthalmic mounting illustrating a preferred embodiment of the invention; Fig. 2 is a rear view of the same, showing one of the lens rims open; Fig. 3 is an enlarged fragmentary view, partly in section, showing the parts in assembled relation; Fig. 4 is a sectional view taken upon the line 4—4 of Fig. 3, looking in the direction of the arrows; Fig. 5 is an enlarged view, partly in section, of the ends of the open lens rim shown in Fig. 2; Fig. 6 is a view similar to Fig. 3 showing the ends of the rim in partly assembled relation, before the insertion of a lens; Figs. 7, 8 and 9 are views of modifications; Figs. 10 and 11 are modifications of the structure shown in Fig. 4; and Fig. 12 is a view illustrating a process of manufacture.

The invention is shown in its preferred form in Figs. 1 to 6 inclusive in connection with an eyeglass frame comprising two split lens rims 2, each enclosing a lens 4 and connected together by a bridge 6. Guard levers 8, supporting nose guards 10 and finger-pieces 12, are pivotally mounted about bearings 13 provided upon posts 14 in close proximity to portions 16 of the bridge and are actuated or swung about the bearings 13 by the customary springs 18. The lens frames, guards and other mechanisms at the sides of the bridge are right-and-left-hand duplicates.

The end pieces 20 and 22 of each rim are constituted of flat, contacting plates, as shown. These plates are provided with alined or substantially registering screw-threaded openings 24 and 26 of the same diameter adapted to form a continuous threaded passage when the end pieces are in contact with each other. The passage registers with the opening in the lever 8. The post 14 is shown as a connecting screw, provided with a terminal threaded portion 28 adapted to enter the screw-threaded openings 24 and 26 to secure the end pieces 20 and 22 together. The bearing portion 13 of the post is of larger diameter than the diameter of the opening 26, thus forming an annular shoulder for engaging the end plate 22 and for maintaining the latter in contact with the end plate 20. The single post 14 thus serves, as shown more particularly in Fig. 7, to secure the end pieces of the rim together and to secure the guard lever to the rim. The tension of the rim upon the end pieces will ordinarily be sufficient to prevent the accidental loosening of the post 14, but the terminal portion 28 may be spun over upon the end piece 20 in a manner well known to serve as an additional means for preventing such loosening. It is preferred, however, to construct the terminal portion 28 of somewhat longer dimensions than shown in Fig. 7, as illustrated in Fig. 3, to permit the use of a check nut 30. The use of the longer post is attendant with an additional advantage in that after the bridge has been adjusted to the personal demands of the wearer, the end pieces need never again be further separated than through the short distance indicated in Fig. 6, the long post still retaining control of both ends. This degree of separation is sufficient for the purpose of replacing broken lenses.

As the bridge is not intended to rest upon the nose, the guards alone being depended upon for supporting the eyeglass, the portions 16 of the bridge may be bent abruptly away from their supporting end pieces 20, substantially parallel to tangents to the rims at the split ends of the rims. The abruptness of the bend serves a double purpose. First, a larger space is provided for the wearer's nose than would be the case if the bend were gradual and this, of course, results in shortening the pupillary distance. The same mounting, secondly, becomes adapted to the personal requirements of a much larger number of purchasers, for all that is necessary is to adjust a larger or a smaller bridge to the desired size. The needs of the ordinary optician's shop may thus be satisfied with a comparatively very small assortment of shapes and sizes. This adjustment of the bridge is usually effected upon the portions 16. It is sometimes necessary to adjust the portions 16 for other reasons, even when the bridge is of the proper size. When the degree of adjustment required is considerable, the operation is rendered very difficult and awkward by the presence of the guard levers near to the parts which it is desired to adjust.

According to the present invention, the bridge is secured to one end piece 20 and the guard lever 8 is carried by the other end piece 22, so that simply a separation of the end pieces, as illustrated in Figs. 2 and 5, will remove the guard levers from the vicinity of the bridge and permit free access to the parts of the bridge which it is desired to adjust. This separation may be effected by reversely rotating the post 14 until the terminal screw-threaded portion 28 has been screwed out of the opening 24. So far as this feature of the invention is concerned, it is obviously immaterial whether the guard lever is of the spring-pressed, pivoted type or of any other type, such as that shown in Fig. 8. The guard may, indeed, be integral with its supporting end piece 22, a construction which is often adopted in connection with spring bridges 31 as shown in Fig. 9.

If it were necessary to remove the guard lever 8, the spring 18 and the post 14 upon the separation of the end pieces, there would be danger of some of the smaller parts becoming lost. The parts are, therefore, detachably mounted upon the end piece 22 but are prevented from becoming accidentally displaced therefrom by a construction which will now be described. The post 14 is provided with an intermediate reduced, unthreaded portion 32 between, and adjacent to, the screw-threaded terminal portion 28 and the bearing 13. The post 14 may therefore be brought by a turning movement into threaded engagement with either of the end pieces 20 and 22 exclusively of the other; and after the terminal portion 28 has been screwed through the opening 26, the intermediate, reduced portion 32 will lie freely in the opening 26. Further turning of the post will result in the end pieces becoming bound snugly together, the annular shoulder of the bearing portion 13 limiting the further advance of the post into the screw-threaded opening 26. As the threads of the terminal portion 28 prevent the accidental withdrawal of the post through the opening 26, the post is thus freely rotatably secured to the end piece 22, with the guard lever 8 and the spring 18 maintained in position upon the post between the end piece and the post head 34. The head 34 is provided with an annular shoulder, as shown, adapted to be engaged by an annular flange integral with the lever 8. The spring 18 is coiled about the flange of the lever 8 and, beyond the shoulder of the head 34, about the post 14. The post 14, with the guard lever 8 and the spring 18 carried thereby, are thus prevented from falling off the end piece when occupying the position shown in Figs. 2 and 5. The guard lever 8 and the post 14 are similarly freely rotatably secured to the end piece 22 of the structure shown in Fig. 8 and the post 14 is similarly freely rotatably secured to the end piece of Fig. 9. An eyeglass is thus provided in which the guard, the guard parts and the post are normally held together and are protected from accidental displacement, but may be readily separated, when desired, by simply unscrewing the post through the opening 26 of the end piece 22. By reason of the free rotatable mounting of the post 14 upon the end piece 22, furthermore, the post may readily be screwed into the opening 24, after the bridge has been adjusted, to resecure the end pieces 20 and 22 together.

There is a tendency for the end pieces to pivot relatively to each other about the post 14 at such times as during the manipulation of the finger pieces 12. As the bridge and the guard are mounted upon the separate end pieces, this pivotal movement would upset the adjustment of the guard relatively to the bridge, and would furthermore involve danger of chipping the lens at the point 36, Fig. 2. To eliminate this tendency, the end piece 20 is offset at 40, so that the offset or projecting portion may overlap the end piece 22 and enter the recess 38. The portion 40 engages the walls of the recess, locking the end pieces together. As the portion 40 constitutes the terminal portion of the bridge, which is thus shown as continuous or integral with the end piece 20, the bridge, in effect, coacts with the end piece 22 to prevent relative movement of the end pieces. The guard lever of Fig. 8 may be similarly recessed, the bridge entering the recess to prevent relative movement of the guard with respect thereto.

The present invention lends itself equally readily to the production of ophthalmic mountings the bridges and the guards of which may be mounted directly in the plane of the lens or forward or back of this plane. This feature of the invention will be easily understood by reference to Figs. 4, 10, 11 and 12.

It will conduce to a clearer understanding of these figures to state that the invention is illustrated in connection with the composite-zylonite-and-metal frame of Patent No. 1,293,232, Feb. 4, 1919, the zylonite element of the rim 2 being indicated at 42 and the metal element at 44. The end pieces 20 and 22 are soldered or otherwise secured to the ends of the metal element 44. The end pieces are originally of the shape shown in full lines in Fig. 12, which is a plan view, and comprising, in effect, two substantially cylindrical portions 46 and 48, secured together at 50. The cylindrical portion 48 may be bevelled at 52, to produce a finished effect, shown in Fig. 5.

To produce a mounting the bridge and the guards of which shall be approximately in the plane of the lenses, the cylindrical portion 46 should be cut along the lines 54, 56 and 58 (Fig. 12). An end of the metal element 44 may then be soldered or otherwise secured to the faces of the end piece along the lines 56 and 58, the zylonite element 42 being secured as shown in Fig. 4. The recess 38 should be cut out along the line 60. Similarly, if the cylindrical portion 46 be secured along the lines 62, 64 and 66, an inset structure may be produced, as shown in Fig. 11; and the outset structure of Fig. 10 may be obtained by cutting along the lines 68, 70 and 72. The end piece may thus be secured to the lens rim at a variable angle. The corresponding variably positioned recesses 38 of Figs. 11 and 10 may be obtained by cutting along the lines 74 and 76, but in practice it is found that the recess 38 may in all cases be cut along the line 60 and the bridge portion 40 may be bent a little in one or the other direction so as to conform. Whether the structure of Fig. 4 be employed, or the inset of Fig. 11 or the outset of Fig. 10, the bridge will cooperate with the end piece 22 to securely lock the end pieces 20 and 22 against pivotal movement.

Many modifications will occur to persons skilled in the art within the spirit and scope of the invention as defined in the appended claims.

What is claimed as new is:

1. An eyeglass mounting having, in combination, a split lens rim, one end of which is provided with a recess and the other end of which is provided with a projection adapted to enter the recess thereby to prevent a relative movement of the lens, a guard carried by the recessed end, and a bridge continuous with the projection secured to the other end.

2. An ophthalmic mounting having, in combination, a lens rim provided with end pieces having alined screw-threaded openings, a post detachably connected to the rim for securing the rim in position upon a lens, the post having a head, a terminal threaded portion, an intermediate portion and a bearing portion, whereby the post may be threaded first through one of the screw-threaded openings and then through the other screw-threaded opening, the intermediate portion normally lying freely within the first-named opening, and a guard mounted about the bearing portion.

3. An ophthalmic mounting having, in combination, a lens rim provided with plates having aligned screw-threaded openings, and a post detachably connected to the rim for securing the rim in position upon a lens, said post having a head, a terminal-threaded portion, a reduced intermediate portion, and a portion between the head and the reduced portion of larger diameter than the diameter of one of the openings, whereby the post may be threaded first through the said opening and then through the other opening, the intermediate reduced portion normally lying within the first-named, screw-threaded opening, and the enlarged portion forming a shoulder for engaging the end plate provided with the first-named opening to maintain the end plates in contact with each other.

4. An eyeglass mounting having, in combination, a split lens rim, having contacting end plates provided with alined screw-threaded openings of the same diameter, a screw for securing the ends together having a head, a terminal threaded portion adapted to be screwed into said openings, an intermediate reduced portion, and a bearing portion between the head and the reduced portion of larger diameter than the diameter of the openings, the terminal portion being screwed through one of the openings into the other opening and the reduced portion lying freely within the first-named opening, and a guard mounted about the bearing portion.

5. An ophthalmic mounting having, in combination, two split lens rims, a bridge having two substantially parallel end portions connected together by an intermediate portion, one of the said end portions being secured to an end of one of the rims and the other end portion being secured to the corresponding end of the other rim in positions substantially parallel to tangents to the rims at the said ends, whereby the said end portions sharply overlap the other ends of the rims, thereby providing for a comparatively narrow pupillary distance, guards carried by the said other ends of the rims in close proximity to the said end portions of the bridge, and means for securing the split ends of the rims together, the rims being separable at the ends to permit adjustment of the bridge without interference by the guards, and the guards being adapted to support the mounting upon the nose of a wearer with the bridge out of contact with the nose.

6. An eyeglass mounting having, in combination, a split lens rim one end of which is forked to provide a recess and the other end of which is offset so as to enter the recess thereby to prevent a relative movement of the ends, a bridge continuous with the offset portion, and a guard carried by the recessed end.

7. An ophthalmic mounting having, in combination, a pair of split lens rims one end of each of which is provided with a recess, and a bridge connecting the other ends and entering said recesses to prevent a relative movement of the ends of each rim.

8. An eyeglass mounting having, in combination, a pair of split lens rims one end of each of which is forked to provide a recess, a guard carried by each of said ends, a bridge integrally connecting the other ends and enclosed between the forks of each recess to prevent a relative movement of the ends of each rim, and means for securing the ends of each rim together.

9. An eyeglass mounting having, in combination, a pair of split lens rims one end of each of which is forked to provide a recess, a bridge integrally connecting the other ends and enclosed between the forks of each recess to prevent a relative movement of the ends of each rim, the ends of each rim being provided with alined screw-threaded openings, a post for securing the ends of each rim together having a head, a terminal threaded portion and a reduced intermediate unthreaded portion, the intermediate portion lying freely within the opening of the recessed end and the terminal portion being screw-threaded into the other opening, and a guard mounted upon each of said posts between the head and the recessed end.

10. An ophthalmic mounting having, in combination, a split lens rim having a recessed end piece secured to one end of the rim at an angle to the plane of the rim, and a bridge secured to the other end of the rim adapted to enter the recess, whereby the bridge is mounted out of the plane of the rim.

11. In eyeglass construction, in combination, an eyeglass rim having a pair of substantially adjacent end members, a swinging nose lever, a connecting member for holding said ends together and serving as a pivot for said nose lever, and cooperating means in each of said ends and on said connecting member whereby said connecting member may engage either of said ends exclusively of the other.

12. In eyeglass construction, in combination, a pair of eyeglass members having substantially registering threaded openings, and a connecting screw having a threaded portion and an adjacent portion of reduced diameter whereby said screw may be brought by a turning movement into threaded engagement with either of said members exclusively of the other.

13. In eyeglass construction, in combination, an eyeglass rim having a pair of end members, a pair of registering threaded openings in said end members, and a screw having a part adapted to engage one of said end members and limit its movement thereinto and having a threaded part spaced from said engaging part by a part of reduced diameter whereby upon said screw being turned in one direction it will engage one of said members and have a threaded connection exclusively with the other of said members, and upon being turned in the other direction will have a threaded engagement with the first member only.

14. In eyeglass construction, in combination, an eyeglass rim having a pair of end members, registering openings in said end members, a nose lever adapted to swing upon one of said end members, and a screw having a pair of shoulders adapted respectively to engage said last end member and the surface of said lever opposite thereto and having a threaded portion connected with that portion of the screw having said pair of shoulders by a portion of reduced diameter adapted to be moved into engagement with either of said end members exclusively as the screw is turned in one or the other direction.

15. In eyeglass construction, in combination, an eyeglass rim having a pair of end members, registering openings in said end members, a nose lever adapted to swing upon one of said end members, a screw having a pair of shoulders adapted respectively to engage said last end member and the surface of said lever opposite thereto and having a threaded portion connected with that portion of the screw having said pair of shoulders by a portion of reduced diameter adapted to be moved into engagement with either of said end members exclusively as the screw is turned in one or the other direction, and a spring coiled between the head of said screw and the upper surface of said lever and tending to swing said lever.

16. In eyeglass construction, in combination, an eyeglass frame having a pair of end members, a pair of registering openings in said end members, a nose lever provided with an opening registering with said pair of openings and with an annular flange about said opening formed integral with said lever, and a connecting member fitted within said flange and projecting into said pair of registering openings adapted to connect said end members together, said connecting member having a shoulder adapted to engage the end surface of said flange and another shoulder adapted to engage one of said end members and limit its movement thereinto.

17. In eyeglass construction, in combination, an eyeglass frame having a pair of end members, registering openings in said end members, one of said openings being threaded, a nose lever provided with an opening and with an annular flange about said opening, a screw fitted within said flange and passing through said opening in one of said end members and threaded into the other, said screw having a shoulder adapted to engage the end surface of said flange and another shoulder adapted to engage said end member through which it passes to limit its movement thereinto, and a spring coiled about said flange and said screw and connected to tend to swing said lever.

18. In eyeglass construction, in combination, a pair of eyeglass members having substantially registering threaded openings, a connecting screw having a threaded portion and an adjacent portion of reduced diameter whereby said screw may be brought by a turning movement into threaded engagement with either of said members exclusively of the other, and a swinging nose lever mounted upon said screw.

19. In eyeglass construction, in combination, a pair of eyeglass frame members having registering threaded openings, a swinging nose lever mounted on one of said members and provided with an opening and an annular flange about the same, a screw member threaded to engage either of said registering threaded openings and provided with a pair of shoulders one of which is adapted to engage one of said frame members and the other of which is adapted to engage the end surface of said flange, and a spring coiled about said screw upon its surface beyond said second shoulder and upon the outer surface of said flange and held between the head of said screw and said nose lever, said spring being connected to tend to swing said lever.

20. In eyeglass construction, in combination, an eyeglass rim member having a pair of oppositely disposed ends, an end member formed integral with said rim member and extending outwardly from one of said oppositely disposed ends thereof to form a bridge and having a threaded opening therein, a second end member formed integral with said rim member projecting outwardly from the other of said oppositely disposed ends thereof and having a threaded opening registering with said first threaded opening, a connecting screw threaded into said registering threaded openings, and a nose lever pivoted upon said screw and resting upon one of said end members, said screw being shaped to be brought into threaded engagement with either of said end members exclusively of the other.

21. An ophthalmic mounting having, in combination, a lens rim provided with end pieces having alined screw-threaded openings, a post detachably connected to the rim for securing the rim in position upon a lens, the post having a head, a terminal threaded portion, an intermediate portion and a bearing portion, whereby the post may be threaded first through one of the screw-threaded openings and then through the other screw-threaded opening, the intermediate portion normally lying freely within the first-named opening, a guard mounted about the bearing portion, and means for preventing relative movement of the end pieces.

22. An ophthalmic mounting having, in combination, a lens rim provided with end pieces having alined openings, one of the openings being screw threaded, a post mounted in the openings for securing the rim in position upon a lens, the post having a head, a terminal threaded portion, and a reduced intermediate portion, whereby the post may be threaded through the screw-threaded opening and inserted through the other opening, the intermediate reduced portion lying normally within the screw-threaded opening, and the post having a shoulder between the head and the reduced portion for engaging the end piece provided with the screw-threaded opening, and means coacting with the threaded terminal portion, the shoulder and the end pieces to maintain the end pieces in contact with each other.

23. An ophthalmic mounting having, in combination, a lens rim provided with end pieces having alined openings, one of the openings being screw threaded, a post mounted in the openings for securing the rim in position upon a lens, the post having a head, a terminal threaded portion, and a reduced intermediate portion, whereby the post may be threaded through the screw-threaded opening and inserted through the other opening, the intermediate reduced portion lying normally within the screw-threaded opening, and the post having a shoulder between the head and the reduced portion for engaging the end piece provided with the screw-threaded opening, means coacting with the threaded terminal portion, the shoulder and the end pieces to maintain the end pieces in contact with each other, and means for preventing relative movement of the end pieces.

24. An ophthalmic mounting having, in combination, a lens rim provided with end pieces having alined openings, one of the openings being screw-threaded, and a post mounted in the openings for securing the rim in position upon a lens, the post having a terminal threaded portion, a portion of larger diameter than the diameter of the screw-threaded opening, and a reduced intermediate portion, whereby the post may be threaded through the screw-threaded opening and inserted through the other opening, the intermediate reduced portion normally lying within the screw-threaded opening, and the enlarged portion forming a shoulder for engaging the end piece provided with the screw-threaded opening, means coacting with the threaded terminal portion, the shoulder, and the end pieces to maintain the end pieces in contact with each other, and a guard mounted about the enlarged portion of the post.

25. An ophthalmic mounting having, in combination, a lens rim provided with end pieces having alined openings, one of the openings being screw-threaded, and a post mounted in the openings for securing the rim in position upon a lens, the post having a terminal threaded portion, a portion of larger diameter than the diameter of the screw-threaded opening, and a reduced intermediate portion, whereby the post may be threaded through the screw-threaded opening and inserted through the other opening, the intermediate reduced portion normally lying within the screw-threaded opening, and the enlarged portion forming a shoulder for engaging the end piece provided with the screw-threaded opening, means coacting with the threaded terminal portion, the shoulder, and the end pieces to maintain the end pieces in contact with each other, a guard mounted about the enlarged portion of the post, and means for preventing relative movement of the end pieces.

26. An ophthalmic mounting having, in combination, a lens provided with end plates having alined, screw-threaded openings, and a post mounted in the openings for securing the rim in position upon a lens, the post having a terminal threaded portion, a portion of larger diameter than the diameter of one of the screw-threaded openings, and a reduced intermediate portion, whereby the post may be threaded first through the said opening and then through the other opening, the intermediate reduced portion normally lying within the first-named opening, and the enlarged portion forming a shoulder for engaging the end plate provided with the first-named opening to maintain the end plates in contact with each other.

27. An ophthalmic mounting having, in combination, a lens provided with end plates having alined, screw-threaded openings, a post mounted in the openings for securing the rim in position upon a lens, the post having a terminal threaded portion, a portion of larger diameter than the diameter of one of the screw-threaded openings, and a reduced intermediate portion, whereby the post may be threaded first through the said opening and then through the other opening, the intermediate reduced portion normally lying within the first-named opening, and the enlarged portion forming a shoulder for engaging the end plate provided with the first-named opening to maintain the end plates in contact with each other, and means for preventing relative movement of the plates.

28. An ophthalmic mounting having, in combination, a lens rim provided with end plates having alined screw-threaded openings adapted to form a continuous threaded passage when the end plates are in contact with each other, a post detachably connected to the rim for securing the rim in position upon a lens, the post having a head, a terminal threaded portion, a reduced intermediate portion, and a portion between the head and the reduced portion of larger diameter than the diameter of one of the openings, whereby the post may be threaded first through the said opening and then through the other opening, the intermediate reduced portion normally lying within the first-named opening, and the enlarged portion forming a shoulder for engaging the end plate provided with the first-named opening to maintain the end plates in contact with each other, and means for preventing relative movement of the end plates.

29. An ophthalmic mounting having, in combination, a lens rim provided with end plates having alined screw-threaded openings adapted to form a continuous threaded passage when the end plates are in contact with each other, a post detachably connected to the rim for securing the rim in position upon a lens, the post having a head, a terminal threaded portion, a reduced intermediate portion, and a portion between the head and the reduced portion of larger diameter than the diameter of one of the openings, whereby the post may be threaded first through the said opening and then through the other opening, the intermediate reduced portion normally lying within the first-named opening, and the enlarged portion forming a shoulder for engaging the end plate provided with the first-named opening to maintain the end plates in contact with each other, a guard about the enlarged portion, and a spring coiled between the head and the shoulder about the enlarged portion for actuating the guard.

In testimony whereof, I have hereunto subscribed my name this 19th day of December, 1919.

FREDERICK A. STEVENS.